Patented June 22, 1954

2,681,881

UNITED STATES PATENT OFFICE 2,681,881

PROCESS FOR THE PRODUCTION OF ANIMAL PROTEIN FACTOR

Ralph E. Bennett, Terre Haute, Ind., assignor to Commercial Solvents Corporation, Terre Haute, Ind., a corporation of Maryland No Drawing. Application December 15, 1950,
Serial No. 201,068

2 Claims. (Cl. 195—80)

This invention relates to a fermentation process for the production of animal protein factor, commonly referred to as APF. More particularly, it relates to the production of APF by fermentation of nutrient media by means of a previously unknown microorganism which is referred to hereinafter as Streptomyces vinaceus Jones (8542-1). A culture of this microorganism has been deposited at the Northern Regional Research Laboratory of the U. S. Department of Agriculture, Peoria, Ill., No. NRRL-2382.

It has been known for some time that fish meal and fish solubles contain an unidentified factor necessary for proper growth of poultry and swine. Consequently, these materials have been considered necessary ingredients of a proper poultry diet. The supply of fish meal and fish solubles, however, has been variable both in quantity and quality, due to the fact that they are by-products of the fishing industry. Expansion of the poultry market and the resultant demand for feeds containing the unknown growth factor led to a vigorous research program directed towards a new source of the factor. Investigations soon revealed that the factor is present in hen feces (Poultry Science, 26, 432) and cow manure (J. Biol. Chem. 163, 393) although these sources are not considered important as substitutes for fish meal and fish solubles. Subsequent research led to the report by some investigators that the factor is the same as the newly discovered vitamin $B_{12}$. While the factor is still not completely identified, present indications are that APF is a complex containing vitamin $B_{12}$, and two unidentified factors, all of which are necessary for chick growth. (Poultry Science 28, 750.)

While various methods have been investigated the only satisfactory method at present available for determining the amounts of animal protein factor present in any particular material is the chick assay method. In this method one group of chicks is fed a ration free of APF, another is fed the same ration supplemented with fish solubles (a known APF source), and a third group is fed the same basal ration supplemented with the test material. The results are expressed in percent response, i. e. the weight gain shown by the chicks fed the fish soluble ration over the chicks fed the basal ration is taken at 100%, and the weight gain shown by the chicks fed the test ration is based thereon.

I have now discovered that excellent yields of the animal protein factor, or APF, can be obtained by fermenting nutrient media under suitable conditions with a new type of mold isolated from soil collected at Rehoboth Beach, Delaware, which has been designated as Streptomyces vinaceus Jones (8542-1). This new organism has the morphological and cultural characteristics set forth below.

*Morphology.*—Spore-bearing, aerial hyphae straight, monopodially branched and never producing regular spirals. Conidiophores irregularly septate with branches at the septa. Conidia spherical, oval or even cubical with a diameter of 0.4 to 1.0 micron, usually about 0.7. Length of the oval or cubical spores up to twice their diameter. Conidiophores slightly wider than the spores and much coarser than the substratal hyphae.

The following characteristics are observed in the growth-habits, the colony-products, the coloration and other features of the organism Streptomyces vinaceus Jones (8542-1) when grown on the strata stated below:

*Gelation stab.*—No liquefaction. A buff grey colony, 5 mm. in diameter, forms on the surface of the gelatin. It has a lobed margin and an irregularly folded surface. A thin layer of aerial hyphae develops over most of the colony. An extremely slight growth occurs along the line of inoculation. A dark brown pigment diffuses throughout the upper half of the medium.

*Gelatin plates.*—No liquefaction. Colonies like those on stabs, but up to 12 mm. in diameter and oval. As with the stabs, they become sunken deeply below the original level of the medium producing deep pits. A dark brown ring of diffusible pigment 5 mm. wide surrounds each colony.

*Plain agar plates.*—Substratal mycelium forms a barely visible, colorless, effuse growth. Colonies 17 to 26 mm. in diameter, margin lacerate. No diffusible pigment. Aerial hyphae scanty and white.

*Nutrient agar plates.*—Colonies oval, about 11 by 15 mm. Substratal mycelium as viewed from lower surface, chamois in color becoming cream buff at the periphery; the upper surface dark olive-buff fading to pale olive-buff at the margin. Aerial hyphae occupy central portion of colony and are white to pale-vinaceous-fawn. No diffusible pigment.

*Starch agar plates.*—Colonies circular, 18 to 23 mm. in diameter. Substratal mycelium as seen from lower surface vinaceous-buff to tilleul-buff. Upper surface covered with aerial hyphae colored light vinaceous-fawn with numerous white sectors in every colony. No diffusible pigment. Starch digested in bands 5 to 8 mm. wide around each colony.

*Calcium malate agar plates.*—Colonies oval, usually about 10 by 15 mm. Substantial mycelium, as seen from lower surface, vinaceous-buff fading to colorless at periphery. Aerial hyphae on central 5 mm. area light vinaceous-fawn. Remainder of upper surface cream color to colorless. No diffusible pigment. Calcium malate digested in a zone 0.5 to 4 mm. wide around each colony.

*Bennett's agar plates.*—Colonies oval usually about 20 by 25 mm. Subtratal mycelium as seen from lower surface russet or chestnut brown center with irregular patches or concentric rings of lighter brown, the periphery a cinnamon-buff. Sporogenous hyphae vinaceous-fawn to army brown, practically covering surface of colony. Diffusible pigment of cinnamon buff color.

*Potato plug.*—Thick finely wrinkled growth of substratal mycelium over the entire surface. This growth is cream colored at the base of the slant but becomes brown and finally black in the upper portion. Aerial hyphae absent or barely visible; white. The potato is darkened in the upper portion of the plug.

*Nutrient broth.*—A ring of growth 3 mm. wide forms at the surface on the wall of a flask or tube. This pulls away and if it floats forms sporogenous hyphae. The broth is clear, forms a coarse sediment and becomes alkaline (pH 8.6).

*Litmus milk.*—Milk becomes alkaline (pH 8.7). Cartilaginous ring of growth on tube as for nutrient broth.

*Dextrose, sucrose, lactose, maltose, and mannite.*—Growth with alkaline condition developing. No gas.

*Nitrate reduction.*—Positive but not carried on strongly.

The method used for the production of APF, in accordance with the present invention, comprises inoculating with *Streptomyces vinaceus* Jones (8542-1) a nutrient medium containing a carbohydrate, a protein bearing material and preferably cobalt, and incubating for approximately 2 to 7 days at a temperature of about 28° C., while aerating the medium. At the end of this time, the medium is concentrated and dried as hereafter described and the dry product, containing APF, used as a feed supplement. I have found that about 1-30 parts of cobalt per million stimulates production of APF by the microorganism.

As the protein source, I can use protein-containing materials such as corn steep liquor, cottonseed meal, cereal grains, oil meals, and flours and meals made from seeds from a wide variety of leguminous plants, such as peas, field beans, and the like. Soybean meal and dried thin grain slop are excellent sources of the necessary proteins. I can use a medium containing from 1 to 8%, and preferably about 4% by weight of the protein.

As the carbohydrate source, I can employ any of the sugars such as dextrose, sucrose, maltose and lactose, as well as starch and dextrin. The carbohydrate should comprise from 0.1 to 4% by wt. of the medium, and preferably about 0.5%.

The addition of cobalt to the medium is accomplished by adding a solution of colloidal cobalt or any water-soluble cobalt salt the anions of which are non-toxic to *Streptomyces vinaceus* Jones (8542-1). Insoluble forms of cobalt can be used but less satisfactorily due to the difficulty of obtaining satisfactory dispersions of the small quantities of cobalt throughout the fermentation medium. Suitable forms of cobalt include such materials as the acetate, nitrate, chloride, sulfate, hydroxide or oxide of cobalt. When the material used is water-soluble, it is desirable, of course, to add the material to the fermentation medium in the form of an aqueous solution so as to obtain more complete and more rapid dispersion of the cobalt through the medium.

While the organism *Streptomyces vinaceus* Jones (8542-1) will produce APF over a wide range of conditions, I have found certain conditions to be essential for satisfactory yields. For example, the temperature of the medium should be maintained within the range 25° to 32° C., and preferably as near 28° C. as possible. The initial pH of the medium should preferably be adjusted to the range 6.2-7.2 before inoculation. The proper pH can be maintained throughout the fermentation by the addition of buffers to the medium.

*Streptomyces vinaceus* Jones (8542-1) is an aerobic organism and hence it is essential that air be passed through the medium throughout the fermentation.

The fermentation medium for my new process is prepared according to any of the known methods. For example, all of the solid ingredients, i. e. proteins, carbohydrate and cobalt, are added to the proper amount of water, so as to have the desired proportion of solids in the medium. The resulting mixture is then cooked for about 2 hours at about 120° C. The mixture is next cooled down to about 28° C., inoculated with an active culture of *Streptomyces vinaceus* Jones (8542-1) and fermentation permitted to take place at approximately 28° C. The fermentation is carried out in tanks aerated by introducing air into the medium through a sparger tube or other suitable device. Substantial quantities of APF are ordinarily produced in one day, but maximum APF yields are usually reached after about 2 to 8 days of fermentation under suitable conditions of temperature and aeration. At the conclusion of the fermentation the medium is concentrated and dried and the dry product, containing APF, used as a feed supplement.

The APF concentrates produced by *Streptomyces vinaceus* Jones (8542-1) are thermally stable (as to APF activity) when heated in steam to 100° C., but heating in an autoclave to 121° C. destroys the APF. Alkali treatment of APF-containing supplements likewise destroys APF. Copper has been found to be toxic to cultures of *Streptomyces vinaceus* Jones (8542-1).

The following specific examples will further illustrate my invention:

EXAMPLE I

Fifty gallons of a medium having the following composition was placed in an 80 gallon tank, jacketed to facilitate temperature control:

| | Per cent |
|---|---|
| Dried thin grain slop | 4.0 |
| Dextrose | 0.5 |
| Ammonium sulfate | 0.2 |
| Cobaltous chloride | 0.002 |
| Water to 50 gallons | |

The medium was then heated for 2 hours at 120° C. by applying steam to the jacket and then cooled to 28° C., at which temperature it was maintained throughout the fermentation period.

The medium was then inoculated with 0.5% by volume of an active culture of *Streptomyces vinaceus* Jones (8542-1). Sterile air was supplied through a ring sparger at the rate of 10 cu. ft. per min. After fermentation for 4 days the solids were recovered by concentrating the whole beer in a single tube evaporator, and then drum-drying the concentrate. This operation gave a yield of 66 pounds of solids.

The solids from the above fermentation were assayed for APF, using the chick assay method. The chicks selected for this assay were White Rock chicks hatched from eggs from APF deficient hens. Each group contained 17 chicks, of approximately the same size and appearance. Extremely light or heavy weight chicks were eliminated and only normally appearing chickens were used. One group of 17 chicks was used as a control and fed a basal ration consisting of the following:

| | Per cent |
|---|---|
| Ground yellow corn | 61.60 |
| Expeller soybean oil meal | 29.00 |
| Dehydrated alfalfa (17%) | 5.00 |
| Steamed bone meal | 2.50 |
| Ground limestone | 1.00 |
| Iodized salt | 0.50 |
| Feeding oil | 0.25 |
| Choline chloride | 0.15 |
| Niacin | 0.00176 |
| Calcium pantothenate | 0.00120 |
| Manganese sulfate | 0.0132 |

Another group of 17 chicks was fed the above basal ration, plus 5% condensed fish solubles, a known source of APF. Six additional groups of chicks were fed the basal ration plus varying quantities of the solids obtained from the above fermentation. In the table below the difference between the weight gained by the chicks fed the basal plus fish solubles ration and the weight gain by the chicks fed the basal alone is taken as 100% response, and the percentage response by the groups fed the varying quantities of the test material was based thereon.

Table

| | 6 weeks, wt. in gms. | Percent Response | Percent Mortality | Gm. feed per gm. wt. gain |
|---|---|---|---|---|
| Basal | 215.3 | 0 | 53 | 5.09 |
| Basal +5% Cond. Fish Solids | 307.8 | 100 | 24 | 3.27 |
| Basal +0.0625% Test Solids | 306.0 | 98 | 18 | 3.29 |
| Basal +0.125% Test Solids | 332.3 | 127 | 6 | 3.25 |
| Basal +0.25% Test Solids | 300.5 | 92 | 12 | 3.57 |
| Basal +0.50% Test Solids | 297.5 | 89 | 18 | 3.14 |
| Basal +1.00% Test Solids | 361.8 | 158 | 18 | 2.88 |
| Basal +2.00% Test Solids | 303.1 | 95 | 18 | 3.36 |

EXAMPLE II

A medium was prepared having the following composition:

| | Per cent |
|---|---|
| Soybean meal | 4.0 |
| Dextrose | 0.05 |
| Ammonium sulfate | 0.2 |
| Cobaltous chloride | 0.002 |

The medium was sterilized, inoculated and fermented exactly as described in Example I. Chicks fed 0.025% of this material in a basal ration showed 99% response as compared to 5% fish meal.

EXAMPLE III

A fermentation was carried out with *Streptomyces vinaceus* Jones (8542-1) on a nutrient medium as described in Example I, except that 1% starch was used as the carbohydrate source. The conditions of the fermentation were exactly the same as described under Example I, and the final product showed over 100% response when 0.025% was added to the basal ration of chicks.

The examples herein are given by way of illustration and not of limitation, as it is obvious that certain modifications may be made in the compositions of the media and in the steps of the fermentation process, and in the kinds and proportions of the materials employed, without departing from the spirit and scope of the invention and the purview of the claims.

I claim:

1. The process for the production of APF concentrates, comprising fermenting an aqueous nutrient medium, containing from 0.1 to 4% of a carbohydrate, from 1 to 8% of a protein and from 1 to 30 parts per million of a cobalt compound, by means of the organism *Streptomyces vinaceus* Jones (8542-1), under submerged aerated conditions, separating the solids formed thereby and drying the said solids.

2. The process for producing APF which comprises propagating the organism *Streptomyces vinaceus* Jones (8542-1) in an aqueous nutrient medium containing from 1 to 8% of a protein; from 0.1 to 4% of a carbohydrate and from 1 to 30 p. p. m. of elemental cobalt in the form of a salt, under submerged aerated conditions at a temperature between 25 and 32° C.

References Cited in the file of this patent

UNITED STATES PATENTS

| Number | Name | Date |
|---|---|---|
| 2,530,416 | Wolf | Nov. 21, 1950 |
| 2,595,499 | Wood et al. | May 6, 1952 |

OTHER REFERENCES

Ott: Journal Biol. Chem., 174, July 1948, pages 1047-48.

Bergey's Manual of Determinative Bacteriologists, 1948, 6th ed., Williams and Wilkins.

Horned et al.: Ann. N. Y. Acad. Sci., 51, November 30, 1948, page 193.

Rickes: Science, December 3, 1948, pages 634-5.

Abelson et al.: Science, November 25, 1949, vol. 110, page 566.

Science News Letter for November 12, 1949, page 307.

Science News Letter for April 22, 1950, pages 243-44.

Hendlin et al.: Science, May 19, 1950, vol. III, pages 541-2.